May 24, 1955
H. H. NORMAN
2,708,964
SPRING
Filed Oct. 15, 1951
3 Sheets-Sheet 1
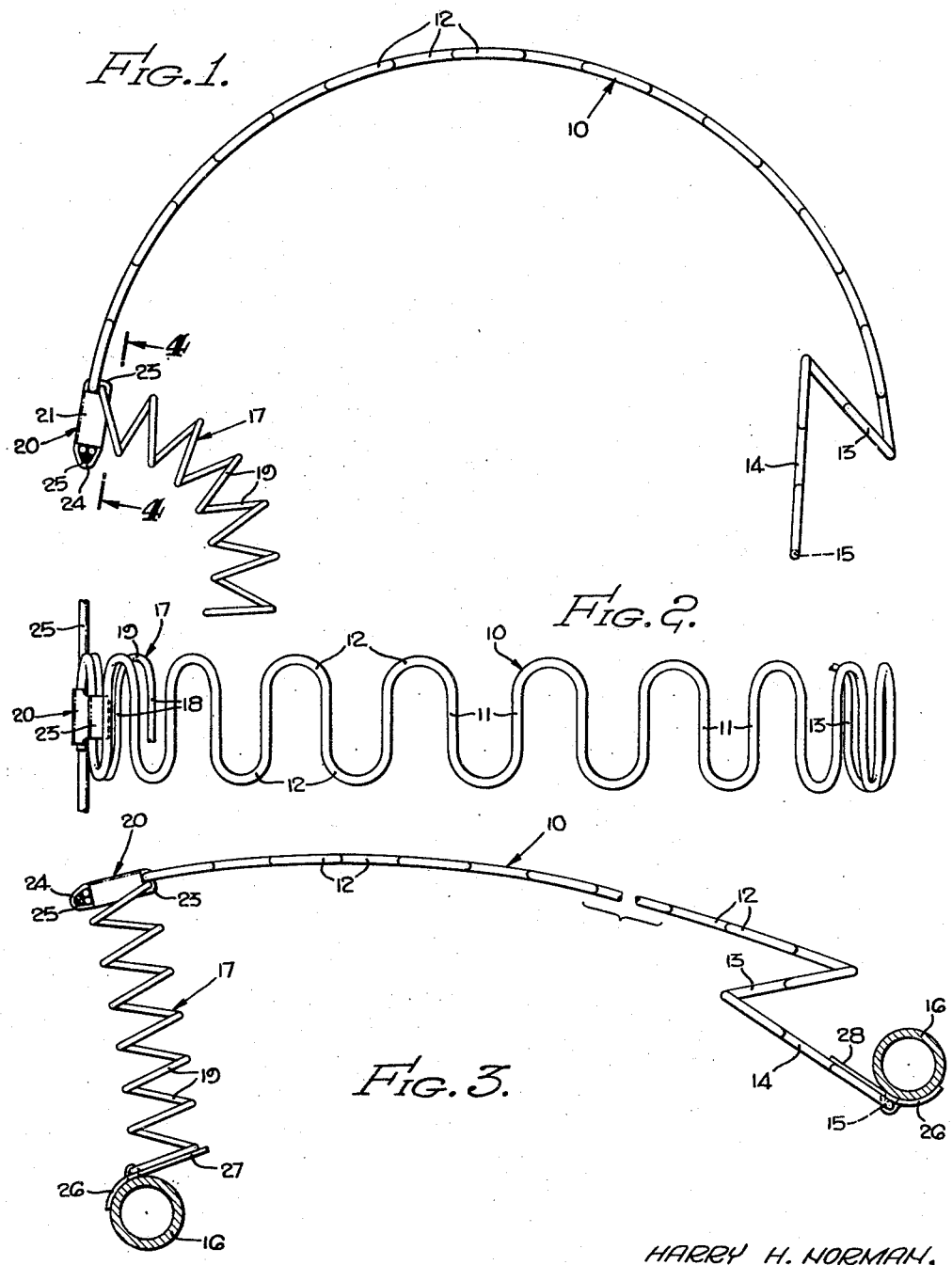
HARRY H. NORMAN,
INVENTOR.
BY
Hazard & Miller
ATTORNEYS

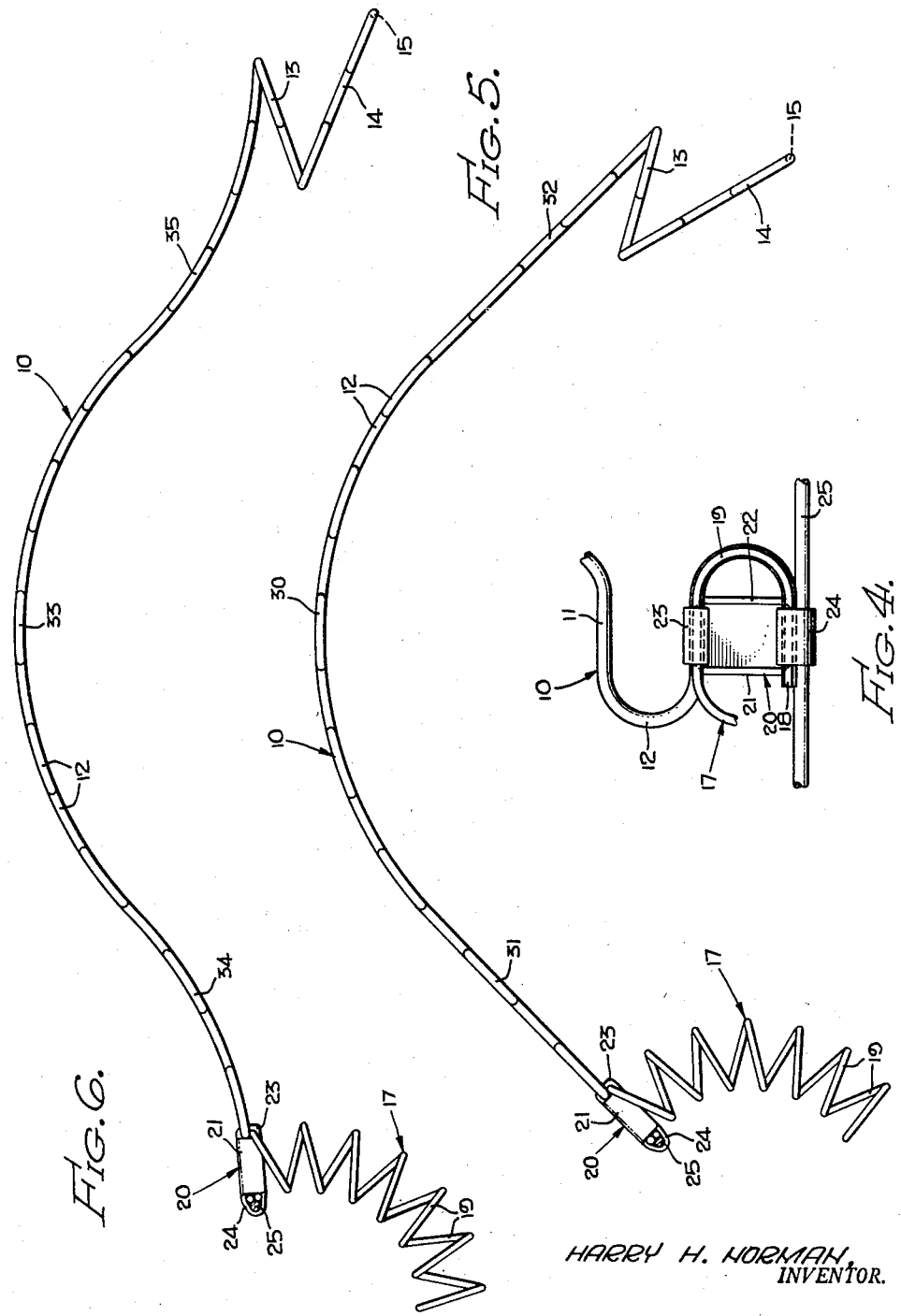

United States Patent Office 2,708,964
Patented May 24, 1955

2,708,964

SPRING

Harry H. Norman, Los Angeles, Calif., assignor to Zig Zag Spring Company, Los Angeles, Calif., a partnership Application October 15, 1951, Serial No. 251,358

6 Claims. (Cl. 155—179)

This invention relates to improvements in springs of the type used in the upholstering of furniture and in automobile seat constructions.

Heretofore springs have been devised consisting of an arched spanning section of zigzag spring wire which, when applied to a supporting structure such as a seat frame, are flattened or stretched from their severely arched condition and are anchored in a stressed condition at two spaced anchoring points on the seat frame. This stretching of the spring from its normal severely arched condition and anchoring it in its flattened condition has the effect of pre-loading the spring in that the lateral bars of the zigzag wire have torsional stresses developed therein and the curved or bent end portions at the ends of the lateral bars have bending moments developed therein.

If a concentrated load is positioned near the center of such a spring the spring is relatively soft at this point and possesses its maximum resiliency. However, if a concentrated load is applied to the spring either near the forward anchoring point or the rear anchoring point only a few lateral bars are present between the load and the anchoring point in which torsion may be further developed and consequently springs of this type are usually comparatively stiff near the anchoring points as contrasted with the resiliency obtainable near the center. Near the center of the spring the greater resiliency is due to the fact that deformation of the spring can be distributed in the form of torsion through a comparatively large number of lateral bars that exist between the center of the spring and the anchoring points.

To overcome this stiffness near the end of the spanning section of a zigzag spring the so-called fishmouth design has been developed wherein a portion of the zigzag spring wire near its forward end is reversely bent beneath the spring and then is reversely bent forwardly against forming a supporting structure for the forward end of the spanning section that is disposed beneath the spring and occupies a position similar to a horizontal V. The fishmouth, when employed, provides a resilient support for the forward end of the spanning section but it has the objection, particularly in automobile and other vehicle seats, of developing a vibration or "jiggle." The vibration of the fishmouth is transmitted to the spanning section and to the person occupying the seat formed by the spanning section, and while the vibration is not severe it is nevertheless present and in some constructions becomes very noticeable and tiring on the eyes.

An object of the present invention is to provide an improved spring construction which employs a spanning section of arched zigzag spring wire and wherein one end of the spanning section which is usually the forward end is supported on the supporting structure or seat frame by a coil compression spring. This compression spring assumes a position almost vertically beneath the forward end of the spanning section, thus eliminating the suspended mass of the fishmouth design which is apt to commence vibrating as above explained and have its vibrations transmitted to the spanning section. The compression spring is further characterized by the fact that when it its mounted condition it is laterally stressed or stressed in a forward direction. The connection between the compression spring and the spanning section is such that it may transmit bending moments. In this manner, the compression spring serves not only to yieldably support the forward end of the spanning section, but in addition, it serves to hold the spanning section under tension and in its flattened condition and to prestress the lateral bars adjacent the forward end of the spanning section in such a manner that the desired resiliency at this point is obtainable.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation of one form of spring embodying the present invention, the spring being shown in its normal unstressed or unloaded condition;

Fig. 2 is a top plan view of the spring shown in Fig. 1, illustrating the spring in the same condition, parts of the compression spring being shown as broken away and removed in the interest of clarity;

Fig. 3 is a view of the spring shown in Fig. 1, but showing the spring in its stressed or loaded condition after it has been mounted upon the seat frame or similar supporting structure;

Fig. 4 is a view taken substantially upon the line 4—4 upon Fig. 1 in the direction indicated to illustrate details of the connecting means;

Fig. 5 is a view similar to Fig. 1, but illustrating an alternative form of construction;

Fig. 6 is a view similar to Fig. 1, but illustrating still another alternative form of construction;

Figure 7:
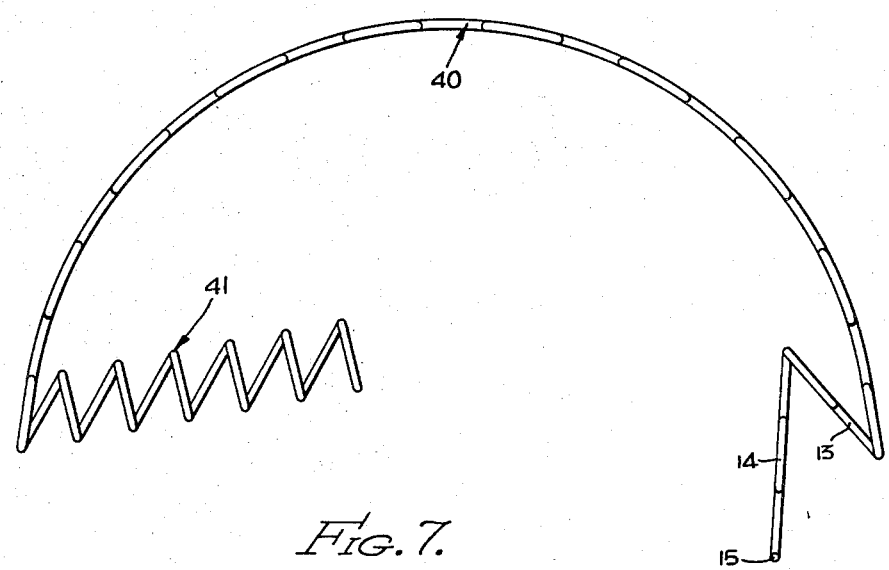
Fig. 7 is a view similar to Fig. 1, but illustrating in its unloaded or unstressed condition still another form of spring embodying the present invention.

Referring to the accompanying drawings wherein similar reference characters designate similar parts throughout, that form of spring illustrated in Figs. 1 to 3 consists of a spanning section 10 formed of zigzag spring steel wire having laterally extending bars 11 connected to each other by curved end portions 12. At the rear end of the spring some of the convolutions are bent as indicated at 13 and 14 to provide an endmost bar 15 that can be employed for attachment to an anchoring point on a seat frame or similar supporting structure 16. The spanning section 10 is generally arched or is bent so that it assumes a smooth, uniform curve when in its normal or unstressed condition. At the forward end of the spanning section there is a coil compression spring 17. This compression spring is preferably ovate in transverse section so that it has lateral bars 18 connected to each other by curved end portions 19. The coil compression spring 17 is axially curved and while the curvature of the axis of the compression spring is shown as being uniform from end to end this is not essential and the curvature may be non-uniform or as hereinafter described, it can even be straight. The uppermost convolution of the compression spring 17 is connected to the forwardmost convolution of the spanning section 10 by a connecting means as to be capable of transmitting bending moments from the compression spring to the spanning section and vice versa. In the preferred form of construction this connecting means consists of a section of sheet metal having its sides 21 and 22 bent at right angles to the plane of the sheet metal and occupying a position fitting between adjacent lateral bars of the spanning section and of the uppermost convolution of the compression spring. The sheet metal section also has end portions 23 and 24 which are bent about the lateral bars of the endmost convolutions and cooperate with the end edges of the sides 21 and 22 to firmly fasten the endmost convolutions of the two spring wire sections together. The end portion 24 is preferably made of sufficient length so that when it is bent about the endmost lateral bars of the two sections it may also enclose a border wire 25 that extends around the spring. The clips 20 as thus constructed consequently serve not only to rigidly connect the top of the compression spring 17 to the forward end of the spanning section 10 so as to be capable of transmitting bending moments across the connection but it may also serve the additional function of providing a means of attaching a border wire. When the spring is in its normal condition, that is an unloaded or unstressed condition, the spanning section is relatively severely arched and the compression spring 17 is likewise severely bent with respect to its axis. The distance or spacing between the endmost lateral bar 15 and the bottom convolution of the compression spring 17 is considerably less than the spacing between these two parts when the spring is applied to the seat frame or supporting structure 16. The seat frame preferably has welded thereto sections of sheet metal 26 which are lanced to receive the endmost lateral bar at the base of the compression spring 17 and the endmost bar 15 on the spanning section. These sections 26 also extend in a tangential direction from their respective sides of the seat frame providing portions 27 and 28 that function somewhat as spring seats and serve to hold the ends of the compression spring and the spanning section in position.

Comparing Fig. 3 with Fig. 1, it will be observed that as the spacing of the anchoring points on the seat frame 16 is greater than the spacing between the ends of the unloaded spring the spanning section, in effect, when it is applied, is stretched between its ends and is straightened out so that it is in a much flatter condition than the severely arched condition shown in Fig. 1. Also, the compression spring 17 has been distorted from its curved condition so that it assumes nearly a straight condition beneath the forward end of the spanning section. The compression spring 17 is consequently preloaded, that is it is attempting to urge the clip 20 and the forward end of the spanning section in a forward direction. This is resisted by the attachment of the rear end of the spanning section to the rear side of the seat frame. The forward bias of the compression spring 17 causes its uppermost convolution to transmit a bending moment through the clip 20 to the forward portion of the spanning section so that the lateral bars of the spanning section adjacent its forward end are subjected to further stress than would be occasioned solely by the straightening of the spanning section between its ends. In this manner, the forward end of the spanning section has a resiliency comparable with the resiliency near the center of the spanning section, and in addition, it is supported by a compression spring 17 having no great suspended mass in which vibrations can be developed and transmitted to the spanning section.

The forms of construction illustrated in Figs. 5 and 6 are substantially the same as that disclosed in Fig. 1, except as to the nature of the curvature of the spanning section. As shown in Fig. 5, the spanning section is arched only near its center as generally indicated at 30. The ends 31 and 32 of the spanning section are substantially straight and extend in a tangential direction from the ends of the arched portion. In this type of spring, when the spring is mounted on a seat frame or supporting structure the central portion 30 tends to remain arched but the end portions 31 and 32 will tend to be depressed and assume an upwardly concave condition. This is particularly true of the forward portion 31 which has the bending moments transmitted directly thereto by the stressed compression spring which is straightened on application to the seat frame from its curved condition shown.

In Fig. 6, the spanning section has a central arched portion 33 and the end portions, instead of being straight as shown in Fig. 5, are initially arched in the reverse direction as indicated at 34 and 35. In other words, the spanning section as depicted in Fig. 6 has its end portions upwardly concave even though the spring is in its unstressed or unloaded condition. When the spring is applied to a seat frame or other supporting structure the compression spring at the forward end is straightened thus putting the spanning section under tension and by reason of the transmitted bending moments the portion 34 will be further depressed from the condition shown. In this manner, it is possible to obtain any contour of the seat that is desired. The spanning section may be entirely arched in an upwardly convex manner as shown in Fig. 1, or in a partially upwardly convex manner as shown in Fig. 5, having straight ends, or in a partially upwardly convex manner as shown in Fig. 6 having upwardly concave ends. The resiliency of the spring at different points along the length of the spanning section can in this manner be somewhat controlled or regulated. It is not necessary that the ends of the spanning section be similarly shaped. In some instances the forward end of the spanning section may be given one shape and the rear portion of the spanning section can be given another shape.

Figure 8:
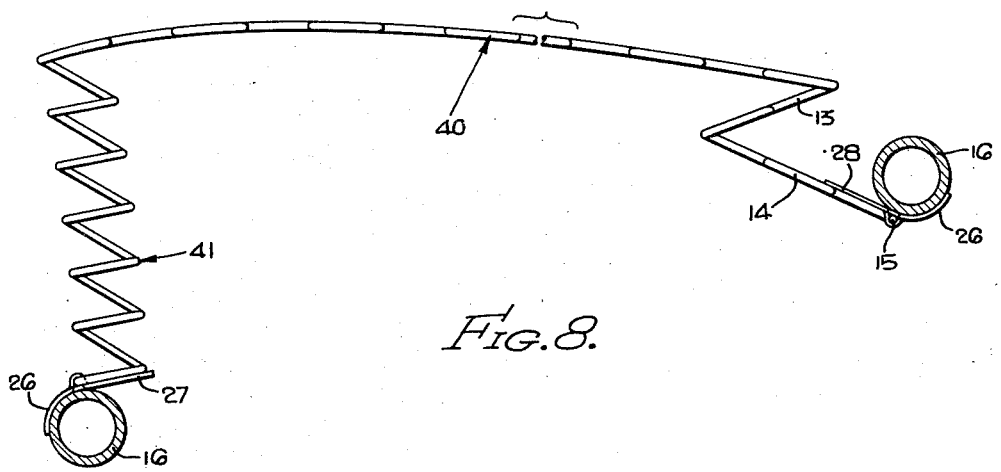
Fig. 8 is a view illustrating that form of spring shown in Fig. 7 in its mounted or stressed condition.

In the construction shown in Figs. 7 and 8, the spanning section 40 is formed of zigzag spring wire shown as having the arched condition similar to Fig. 1. In this form of construction, portions of the zigzag wire at the forward end of the spanning section are reversely bent upon themselves to provide a compression spring 41 that is integral with the forward end of the spanning section. The axis of this compression spring may be straight or curved. The spacing between the base of the compression spring 41 and the rear end of the spanning section is less than the spacing between the anchoring points on the seat frame so that on application of the spring to the seat frame as shown in Fig. 8, it is necessary to shift the base of the compression spring forwardly. This straightens the spanning section and places it under tension and the bias of the compression spring in a forward direction maintains it in this condition. The integral connection between the compression spring and the spanning section enables bending moments to be transmitted from the forwardly biased compression spring to the forward portion of the spanning section.

From the above-described constructions it will be appreciated that an improved spring construction has been developed wherein resiliency as well as contour of the spring from back to front can be controlled or regulated.

Various changes may be made in the details of construction without departing from the spirit and scope of the invention as defined by the appended claims.

I claim:

1. A spring which in its unstressed and unloaded condition comprises a spanning section of zigzag spring wire longitudinally arched, and a coil compression spring secured to one end of the spanning section, the axis of the coil compression spring being curved.

2. A spring which in its unstressed and unloaded condition comprises a spanning section of zigzag spring wire longitudinally arched, and a coil compression spring secured to one end of the spanning section, the axis of the coil compression spring being curved and extending outwardly beyond the end of the spanning section.

3. A spring which in its unstressed and unloaded condition comprises a spanning section of zigzag spring wire longitudinally arched, and a coil compression spring secured to one end of the spanning section in such a manner as to be capable of transmitting bending moments thereto, said coil compression spring being axially curved and extending from a direction approximately normal to the end of the spanning section through its curve beyond the end of the spanning section.

4. A spring construction comprising a supporting structure, an arched spanning section of zigzag spring wire longitudinally arched, means connecting one end of the spanning section to one side of the supporting structure, a compression spring connecting the other end of the spanning section to the opposite side of the supporting structure, the compression spring being axially curved when in unloaded or unstressed condition but when secured to said opposite side of the supporting structure being stressed so as to put the spanning section under tension from the first mentioned side of the supporting structure toward said opposite side.

5. A spring which in its unstressed and unloaded condition comprises a spanning section of zigzag spring wire longitudinally arched, and a coil compression spring secured to one end of the spanning section, the axis of which near its juncture with the spanning section is approximately normal to the spanning section adjacent the juncture, the axis of the coil compression spring being curved in a direction extending downwardly and outwardly beyond the mentioned end of the spanning section.

6. A spring construction comprising a supporting structure, a longitudinally arched spanning section of zigzag spring wire, means connecting one end of the spanning section to one side of the supporting structure, a coil compression spring connecting the other end of the spanning section to the opposite side of the supporting structure, the coil compression spring being axially curved when in unloaded or unstressed condition and the axis thereof near its juncture with the spanning section being approximately normal to the spanning section adjacent the juncture but when secured to said opposite side of the supporting structure being stressed so that the axis of the coil compression spring is substantially straight so as to put the spanning section under tension from the first mentioned side of the supporting structure toward the opposite side thereof.

References Cited in the file of this patent

UNITED STATES PATENTS

| | | |
|---|---|---|
| 1,489,515 | Atkinson | Apr. 8, 1924 |
| 2,156,728 | Krakauer | May 2, 1939 |
| 2,158,647 | Wolfe | May 16, 1939 |
| 2,169,705 | Mouw | Aug. 15, 1939 |
| 2,186,548 | Lotz | Jan. 9, 1940 |
| 2,246,893 | Nordmark | June 24, 1941 |
| 2,526,183 | Williams | Oct. 17, 1950 |